(12) United States Patent
Pasupuleti et al.

(10) Patent No.: US 8,806,746 B2
(45) Date of Patent: Aug. 19, 2014

(54) METHOD FOR CLEANING WIND TURBINE BLADES

(75) Inventors: Praveen K. R. Pasupuleti, Fairless Hills, PA (US); Roberto Hurtado Barba, Fairless Hills, PA (US)

(73) Assignee: Gamesa Innovation & Technology, S.L., Sarriguren (ES)

( * ) Notice: Subject to any disclaimer, the term of this patent is extended or adjusted under 35 U.S.C. 154(b) by 357 days.

(21) Appl. No.: 13/308,255

(22) Filed: Nov. 30, 2011

(65) Prior Publication Data

US 2013/0133199 A1  May 30, 2013

(51) Int. Cl.
*B21D 53/78* (2006.01)
*B21K 3/04* (2006.01)
*B23P 15/02* (2006.01)

(52) U.S. Cl.
USPC ............ 29/889.6; 29/889; 156/389; 156/535

(58) Field of Classification Search
USPC ..................... 29/889, 889.6; 156/389, 535
See application file for complete search history.

(56) References Cited

U.S. PATENT DOCUMENTS

| | | | |
|---|---|---|---|
| 6,195,891 B1 * | 3/2001 | Chen et al. | 29/889.1 |
| 7,946,814 B2 | 5/2011 | Honhoff | |
| 8,449,255 B2 * | 5/2013 | Tadayon et al. | 416/37 |
| 8,449,784 B2 * | 5/2013 | Parkos et al. | 216/34 |
| 8,563,079 B2 * | 10/2013 | Suulivan et al. | 427/140 |

FOREIGN PATENT DOCUMENTS

| | | |
|---|---|---|
| EP | 1 517 033 A1 | 3/2005 |
| EP | 2 141 354 A2 | 1/2010 |
| EP | 2 275 670 A2 | 1/2011 |
| JP | 2002-115646 A | 4/2002 |
| WO | 03/048569 A2 | 6/2003 |
| WO | 2008/077844 A1 | 7/2008 |
| WO | 2011/107087 A2 | 9/2011 |

OTHER PUBLICATIONS espacenet English abstract of WO 2011/107087 A2.
espacenet English abstract of JP 2002-115646 A.
Machine translation of JP 2002-115646 A.

* cited by examiner

*Primary Examiner* — Richard Chang
(74) *Attorney, Agent, or Firm* — Ladas & Parry LLP

(57) ABSTRACT

A fast and effective method for cleaning and repairing the shell-spar glue voids of a wind turbine blade, comprising the steps of detecting voids, raising the turbine blade at an incline, drilling holes into top and bottom ends of the void, injecting cleaning solution into the holes, and allowing the cleaning solution to drain out of the bottom holes and drain holes at the tip. The void is then inspected for oil by FTIR spectroscopy. If oil is detected, additional cleaning steps are performed comprising injection of a second cleaning solution into at least two holes of the void followed by a rest period, washing the holes with water via a pressure washer, and drying with compressed air. The blade is then inspected for oil and moisture, and when clean, adhesive is applied to the void through the holes.

20 Claims, 6 Drawing Sheets

METHOD FOR CLEANING WIND TURBINE BLADES

BACKGROUND OF THE INVENTION

1. Field of the Invention

The present invention relates generally to a method for cleaning wind turbine blades, and particularly to a method for cleaning and repairing the shell-spar glue voids on wind turbine blades.

2. Related Art

A void is a region between the shell and the spar where appropriate adhesive is absent. This area frequently becomes contaminated with oil which can damage the integrity of the turbine blade and lead to decreased performance. Internal voids should be repaired by applying an appropriate adhesive. However, oil and moisture in internal voids can decrease the stability of the adhesive bond and reduce the strength of the blade.

There have been several oil cleaning procedures developed to clean internal voids of a wind turbine blade. Procedures to effectively clean voids have proven difficult because this area is very hard to access in order to clean the region and it is difficult to detect whether the oil has been removed.

SUMMARY OF THE INVENTION

Accordingly, the present invention provides an effective and efficient method for cleaning and repairing the shell-spar glue voids on a wind turbine blade.

The present invention also provides a method for cleaning and repairing the shell-spar glue voids of a wind turbine blade that enables the presence of oil to be easily detected.

According to one aspect of the present invention, a method for cleaning and repairing the shell-spar glue voids of a wind turbine blade is provided. The method involves several discrete stages including a preparatory stage, a plurality of detection stages, at least one cleaning stage, a post-inspection stage, and a repairing stage. The method is relatively fast and highly effective in cleaning and repairing voids. Notably, the method is adapted to detect the presence of oil in the voids in an accurate and efficient manner.

Thermographical instruments are used on the blades in order to detect shell-spar adhesive voids. The turbine blade is placed on an incline from the root to the tip in a manner which will allow a cleaning solution to flow through drainage holes on the tip. Appropriate holes are then drilled into top and bottom ends of the void for receiving and releasing cleaning solution. Cleaning solution is then injected into holes of the void. The cleaning solution is then drained and the void is inspected for oil.

After the initial cleaning step, if oil is detected by FTIR in the inner surface of the void in an amount that is greater than a predetermined acceptable level, a further series of cleaning steps are performed. The additional cleaning steps comprise preparation and administration of a cleaning solution into at least two holes of the void, followed by a rest period. A pressure washer is then placed into each of the holes in order to rinse the cleaning solution from the void. Moisture is then removed from the void, for example by use of an air gun in each hole.

Once the cleaning and drying stages are completed, the blade is inspected for oil and moisture using handheld Fourier transform spectroscopy (FTIR) and, depending on the results, the cleaning and/or drying procedures may be repeated as necessary. After the voids are confirmed to be free of oil and moisture, the voids are repaired by injecting an adhesive into the holes made for the cleaning procedure.

BRIEF DESCRIPTION OF THE DRAWINGS

The above features and advantages of the present invention will become apparent from the following description of exemplary embodiments of the invention, taken in conjunction with the accompanying drawings, wherein.

The invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

Figure 7:
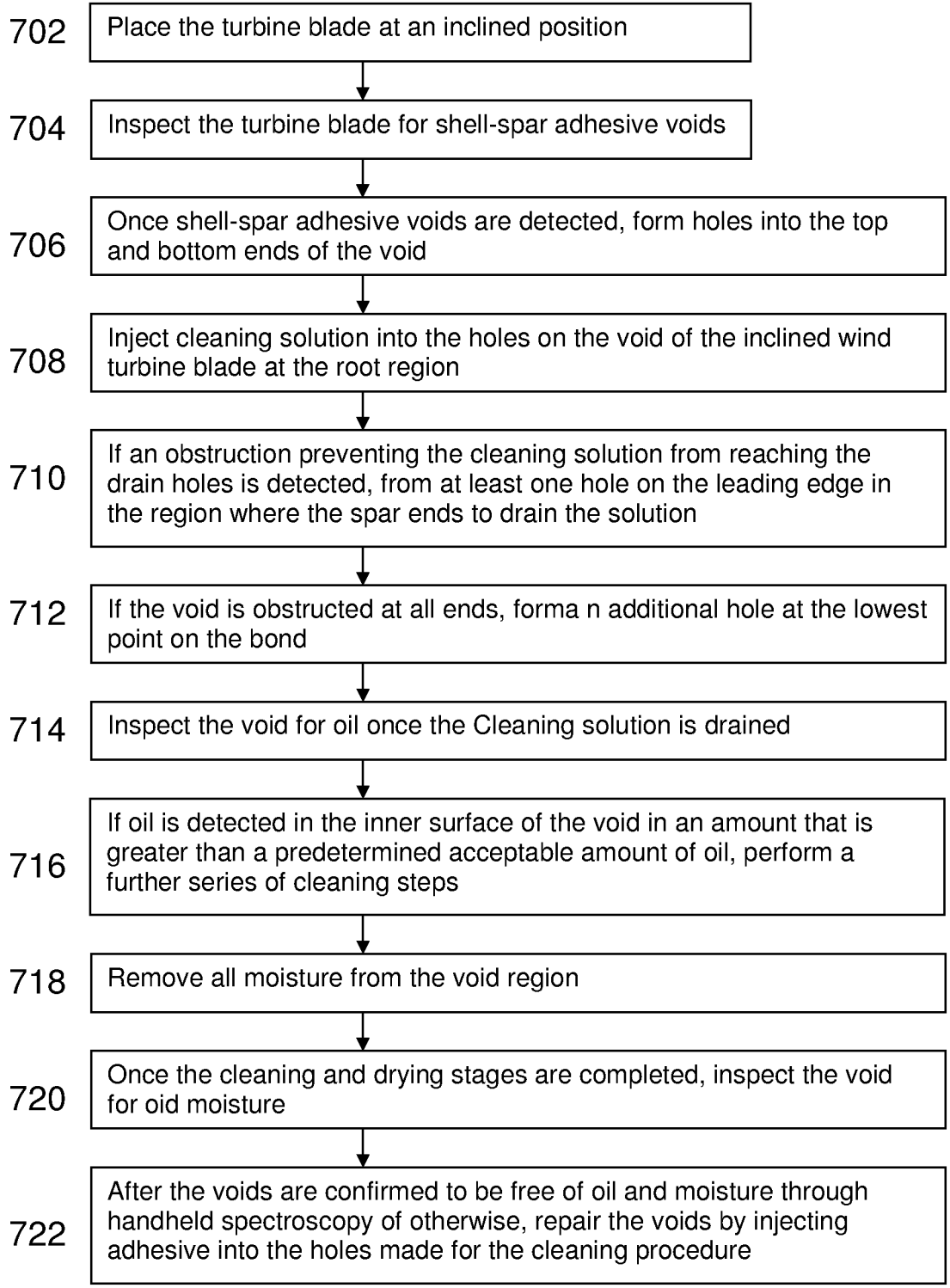
FIG. 7 provides a flow chart of the method according to an example embodiment of the present invention.

The present invention is particularly directed to an improved method for cleaning oil from the blade of a wind turbine, and more particularly to the cleaning and repair of blade shell-spar glue voids. A flow chart of the method 700 according to an example embodiment of the present invention is shown in FIG. 7. Of course, FIG. 7 is just an example, and the present invention is not limited by the steps or order of the steps shown in FIG. 7.

The first step of the method 700 is to place the turbine blade at an inclined position (step 702). The turbine blade is preferably inclined at a level whereby the root is in the range of 0.5-1.5 meters from the ground and the tip is on the bottom. The turbine blade may be inclined by, for example, placing wooden blocks at the root section, or by other means for inclining a turbine blade or similar object known in the art.

Figure 1:
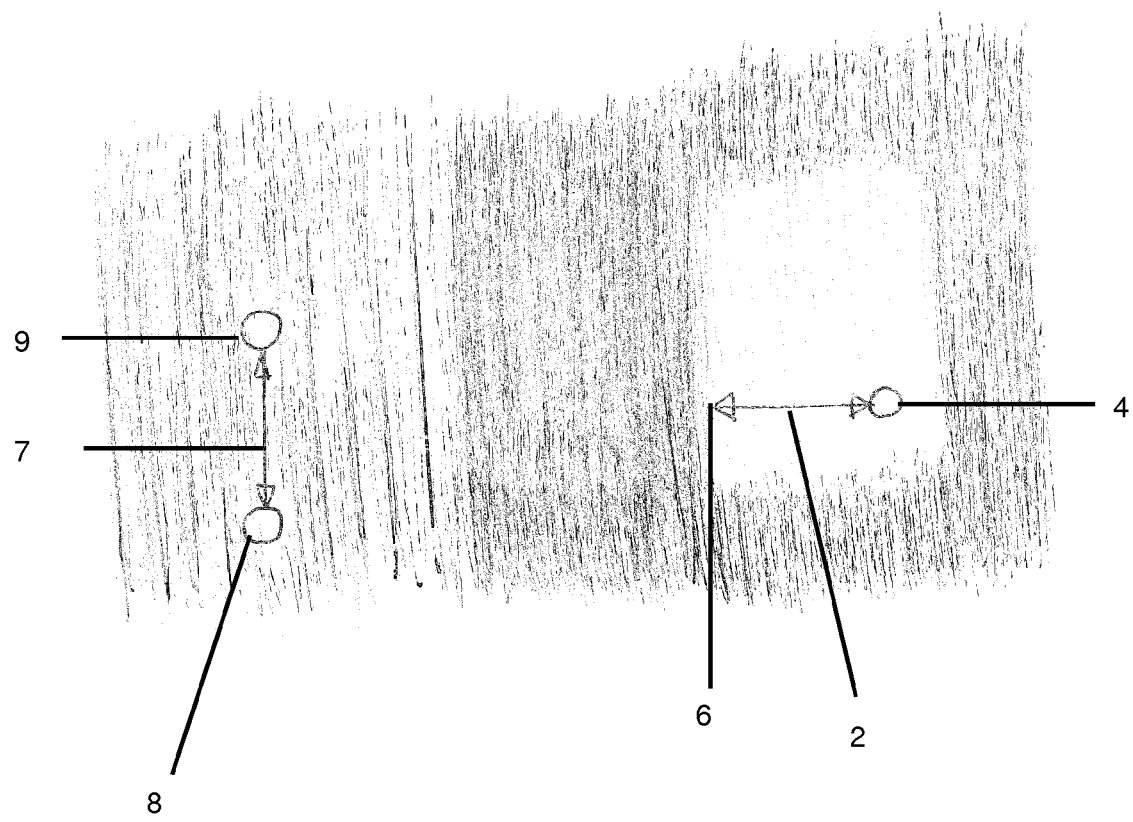
FIG. 1 provides a thermographic image of a void on a turbine blade.

The next step is to inspect the turbine blade for shell-spar adhesive voids (step 704). The detection of shell-spar adhesive voids is preferably performed by thermography. The void regions are detected on both the pressure side and suction side of the blade. As an example, FIG. 1 shows a thermographic image of a void on a turbine blade. Alternatively, the thermography may be performed prior to inclining the turbine blades. Once shell-spar adhesive voids are detected, holes are formed into the top and bottom ends of the void (step 706). The holes may be formed by drilling or any other suitable means in the art. There are preferably two holes formed, but larger voids may require four or more holes to properly clean and repair the void. The holes are preferably in the range of 4-8 mm in diameter and are preferably 6 mm. Each hole is preferably not greater than 15 cm apart from at least one other hole and the distance between any hole and the edge is preferably no more than 7 cm. For instance, in FIG. 1, the distance 2 between the first hole 4 and the edge 6 is less than 7 cm. Furthermore, the distance 7 between the second hole 8 and third hole 9 is less than 15 cm. Of course, these are just examples, and the present invention is not limited thereto.

Figure 2:
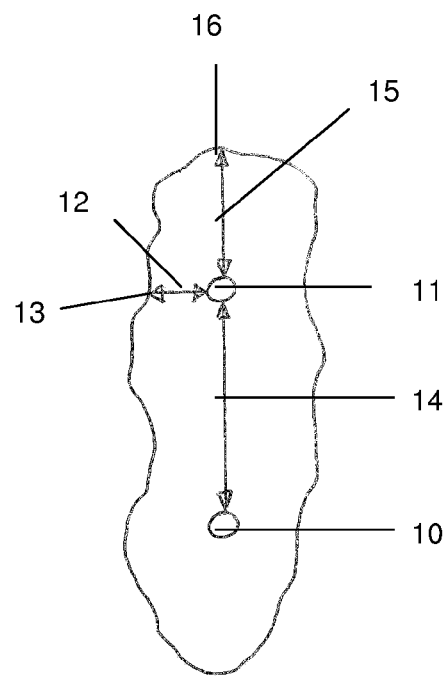
FIG. 2 shows a sketch of a void and the proposed holes thereon.

FIG. 2 shows a sketch of a void with a proposed set of two holes 10, 11 formed thereon. The distance 12 between the second hole 11 and the left edge 13 is less than 7 cm. Similarly, the distance 15 between the second hole 11 and top edge 16 is less than 7 cm. Furthermore, the distance 14 between the first hole 10 and second hole 11 is less than 15 cm.

Figure 3:
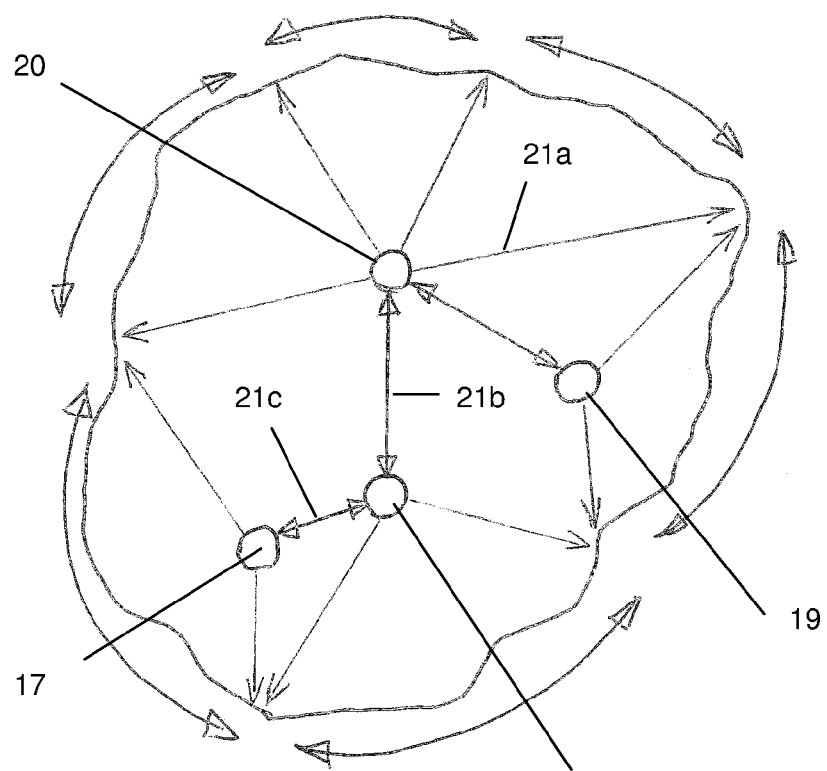
FIG. 3 shows a sketch of a large void with a set of four holes drilled thereon.

FIG. 3 shows a sketch of a large void with a set of four holes 17, 18, 19, 20 formed thereon. Each hole is within 15 cm apart from at least one other hole as indicated by distances 21a, 21b, 21c and the distance between the holes are preferably no more than 7 cm.

The next step of the method (step 708) is to inject cleaning solution into the holes on the void of the inclined wind turbine blade at the root region. The injection of cleaning solution directly into holes on the void allows for sufficient cleaning of voids on all areas of the blade including mid-voids which are not close to the leading or trailing edge, and voids that are close to or on the leading and trailing edges. The blade is injected by using, for example, syringes filled with the cleaning solution. In a preferred embodiment, the syringes are 70 ml in volume and have a diameter opening of approximately 6 mm. However, the syringes may be other volumes and diameters as necessary. The cleaning solution may be any suitable solution known in the art.

It is noted that the present invention allows for using regular pressure to apply the cleaning solution. This can lead to a more effective cleaning procedure, as opposed to using other means where it may be impossible to guarantee regular pressure in all of the different worked holes.

The holes on the tip of the turbine blades serve as drain holes for draining of the cleaning solution. The incline of the turbine blade is sufficient to allow for the draining of the cleaning solution through drain holes located at the tip. The cleaning solution is collected at the drain holes by a drum or other suitable container.

Figure 4A:
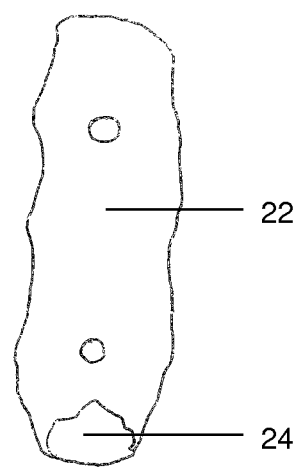
FIG. 4a shows a void obstructed at all ends with stagnant cleaning fluid.
Figure 4B:
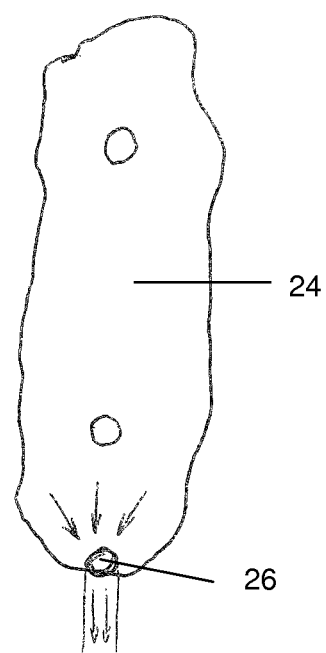
FIG. 4b shows the obstructed void after a hole is drilled at the lowest point to release the cleaning fluid.
Figure 8:
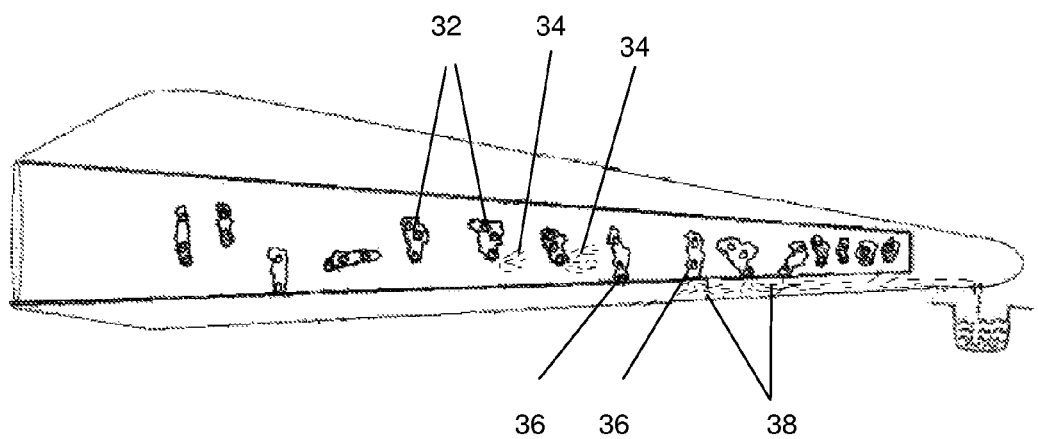
FIG. 8 shows an illustration of voids on a turbine blade according to an example embodiment of the present invention.

When the cleaning solution is injected, if the user observes a low volume of cleaning solution flowing through the drain holes, this is indicative of an obstruction that is preventing the cleaning solution from reaching the drain holes. If an obstruction is detected at the drain hole, the next step of the method (step 710) is to form at least one hole on the leading edge in the region where the spar ends to drain the solution. If the void is obstructed at all ends, then an additional hole may be formed at the lowest point on the bond (step 712) to release the cleaning fluid. If the void is a mid spar void 32 (see FIG. 8), the solution may not fall into the shell, and the formation of an additional hole on the lowest point allows the stagnant solution 34 to travel out of the skin and into the atmosphere (open area). A tray bucket or collection sheet can therefore be placed under the work area. If the void is on the leading or trailing edge (see, e.g., the voids 36 open towards the leading edge in FIG. 8), the formation of the additional hole will cause the cleaning fluid to fall into the shell. In this case, if the void is open, solution enters the shell upon injection (at 38), but if the void is closed, the additional hole in the edge causes the stagnant solution to fall into the shell. The cleaning fluid will then gradually move towards the tip and get collected. For instance, in FIG. 4a, a void 22 obstructed at all ends is shown injected with cleaning fluid 24. The cleaning fluid 24 remains stagnant. In FIG. 4b, a hole 26 is formed at the lowest point on the bond which enables the cleaning solution to be released.

Figure 5:
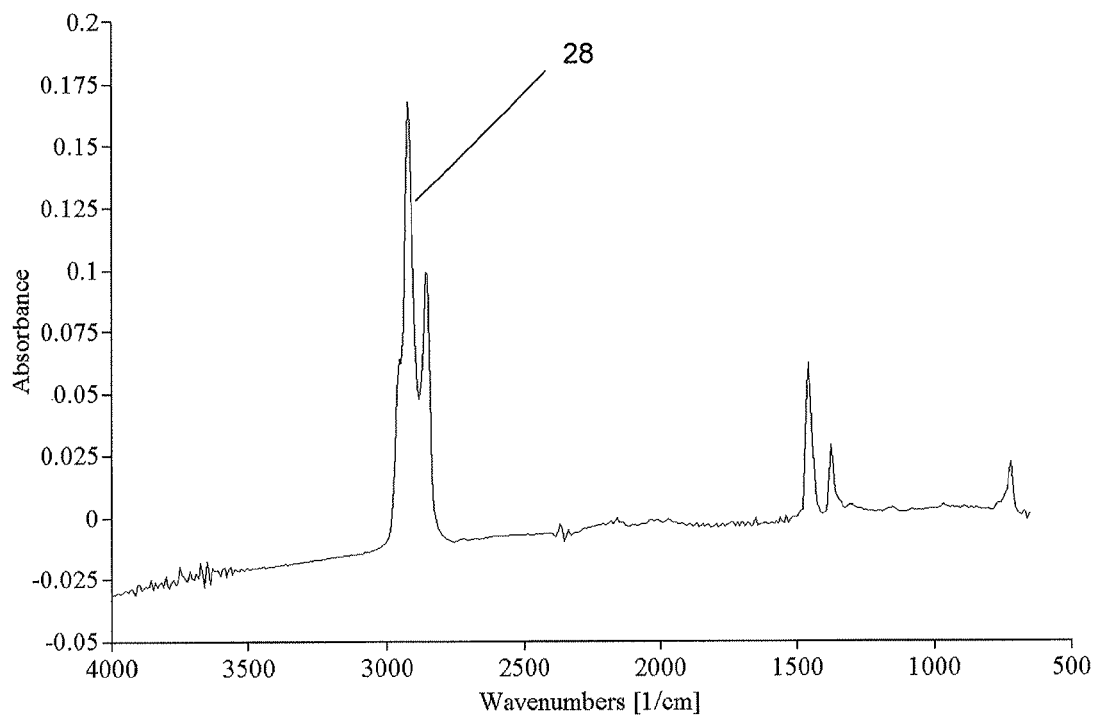
FIG. 5 shows spectrometer results for a sample taken from a void.

Once the cleaning solution is drained, the next step of the method (step 714) is to inspect the void for oil, preferably by use of handheld FTIR spectroscopy. Since handheld spectrometers are of a passive touch-to-sample method, the detection of oil is preferably performed by obtaining a sample from the internal surface of the void region. In a preferred embodiment, a swab with an absorbent tip is inserted into the void from at least one hole on the top of the void and one hole on the bottom of the void. The user obtains the sample by firmly rubbing the swab against the inner surfaces of the void. The swab is then removed from the holes and the absorbent material of the swab is detected for oil using the handheld spectroscopy. FIG. 5 shows spectrometer results for a sample taken from a void. The region 28 between 3000 and 2750 l/cm is typical of the C—H stretch in oils and is a very reliable indicator of the presence of oil.

An alternative method for detection of oil by handheld spectroscopy is to use a solvent extraction method. While solvent extraction can produce very accurate spectroscopy results, this method is not as preferred because solvents used in this process such as Hexane or Acetonitrile may damage the composite surfaces of the turbine blade. In a further alternative embodiment, the presence of oil may be detected by visually inspecting the swab that was rubbed against the inner surface of the void.

If oil is detected in the inner surface of the void in an amount that is greater than a predetermined acceptable amount of oil, a further series of cleaning steps are performed (step 716). The first step is to prepare a cleaning solution. In a preferred embodiment, the cleaning solution comprises Simple Green® solution having active ingredients including 2-butoxyethanol, ethoxylated alcohol mixture, tetrapotassium pyrophosphate, and sodium citrate. The Simple Green® solution is diluted 1:1 with water, but may be diluted in other ratios including, but not limited to, 1:2, 1:3, and 1:4. While use of Simple Green® is particularly described, any other suitable cleaning solutions may be used.

The cleaning solution is then injected into at least two holes of the void. In a preferred embodiment, the cleaning solution is injected by a 70 ml syringe. After the void is injected, a rest period of approximately fifteen minutes is given to allow the cleaning solution to cleanse the void. Once the rest period is over, a pressure washer is placed into each of the holes in order to rinse the cleaning solution from the void. In one embodiment, the tip of the syringe used for injecting the cleaning solution is secured to the end of the pressure washer in order to ensure a proper fit into the holes of the void. The pressure washer preferably exerts 2000 psi of pressure with a flow rate of 2.5 gpm. The pressurized water is preferably injected by the washer into each hole for a total of 3 seconds per hole. The injection of cleaning solution and rinsing with a pressure washer may be repeated on the other holes in the void.

The next step of the method (step 718) involves removing all moisture from the void region so that the void is in a sufficient condition to be repaired with an adhesive. In a preferred embodiment, the void region is dried by using a portable air gun in each hole to inject compressed air from the top to the bottom of the void. The compressed air is preferably applied for approximately 5 minutes in each hole.

Figure 6:
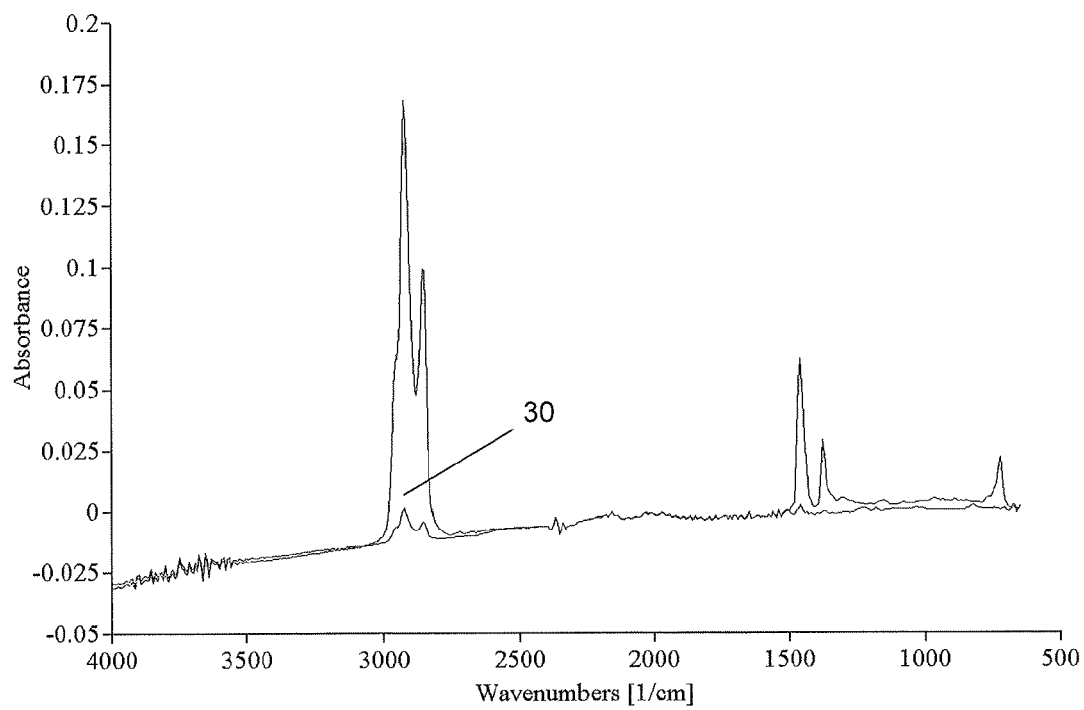
FIG. 6 shows spectrometer results for a second sample taken from a void.

Once the cleaning and drying stages are completed, the next step (step 720) is to inspect the void for oil and moisture using handheld spectroscopy in accordance with the procedures previously described. As an example, FIG. 6 shows the spectrometer results after cleaning wherein the small level of components in the C—H band region 30 between 3000 and 2750 l/cm indicates a very low presence of oil. If oil is still detected in the void then the next step is to repeat the cleaning and drying procedures. If only moisture is detected in the void then further drying of the void through injection of compressed air may be performed.

After the voids are confirmed to be free of oil and moisture through handheld spectroscopy or otherwise, the voids are repaired (step 722), for example by injection of fast curing polyurethane adhesive in the holes made for the cleaning procedure. The adhesive is preferably applied starting at the holes on the root and ending at the holes on the tip. It is preferable that the gluing is performed no more than 4 hours after the cleaning and drying process is completed.

Accordingly, in the present invention:
- A method is employed whereby cleaning solution is directly injected into the void maintaining a constant and adequate pressure in all of the voids to remove oil.
- Solution that is stagnant in the void (mid voids, voids not open at either end) is removed by pressure through, e.g., an air gun. Injected solution drains out from the same drilled hole due to pressure. Collection sheets/trays are placed right underneath the void.
- For voids that are either open at the TE (trailing edge) or LE (leading edge), the solution falls into the shell and is then collected at the tip.

The procedure described above is quick and is highly effective at cleaning and repairing voids in a wind turbine blade or like structure. For example, the procedure for cleaning a void region requiring seven holes can be performed in approximately 85 minutes including two rounds of cleaning and drying, pre-inspection, and post inspection.

In an embodiment, samples are first prepared and then cleaned to further analyze the efficacy of the procedure on the blades to be cleaned. For instance, a sample may be prepared comprising a plurality of panels that are bound together and contaminated with oil. The sample is then cleaned in accordance with the method and the presence of oil is detected by FTIR spectroscopy. Lap shear tests are then performed on the cleaned panels to measure the strength of the panels.

The FTIR results and lap shear tests results for the samples provide a further measure of the effectiveness of the cleaning procedure. For instance, lap shear tests indicate that the panels have sufficient structural integrity when trace amounts of oil remain on the panels after the cleaning procedure. Since FTIR spectroscopy does not provide a precise quantitative measurement of the amount of oil remaining on the cleaned blades, FTIR results of the cleaned blades can be compared to FTIR results from the sample panels and corresponding lap shear tests in order to further confirm the effectiveness of the cleaning process and that the cleaned blade will exhibit sufficient strength.

The procedures may be adjusted as necessary to effectively clean and repair a turbine blade. For example, the number of times void holes are cleaned, the cleaning solvent concentration, and the rest times, drying times, etc. may all be adjusted to achieve desired results. The FTIR spectroscopic analysis is particularly useful in providing feedback on the effectiveness of the procedure and methods which may be adjusted to achieve the desired result.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for cleaning shell-spar adhesive voids of a wind turbine blade, comprising the steps of:
   detecting a void using thermography;
   forming holes in top and bottom ends of the void;
   injecting cleaning solution into the holes with regular pressure using at least one syringe;
   inspecting the void for oil after the cleaning solution is drained; and
   drying the void by injecting compressed air removing moisture from the void.

2. The method of claim 1, further comprising the step of performing a further cleaning steps if oil is detected in an inner surface of the void in an amount that is greater than a predetermined amount of oil.

3. The method of claim 2, wherein the further cleaning steps include injecting cleaning solution into at least two holes of the void, waiting a predetermined rest period, and using a pressure washer to rinse the cleaning solution from the void.

4. The method of claim 1, further comprising the step of initially placing the turbine blade at an inclined position, wherein the cleaning solution is injected into the holes on the void of the inclined turbine blade at a root region.

5. The method of claim 1, further comprising the step of forming at least one hole on the leading edge in the region where the spar ends to drain the cleaning solution, if an obstruction preventing the cleaning solution from reaching the holes is detected.

6. The method of claim 1, further comprising the step of forming an additional hole at the lowest point on the bond if the void is obstructed at all ends.

7. The method of claim 1, further comprising the step of repairing the void by injecting adhesive into the holes, after the void is confirmed to be free of oil and moisture.

8. The method of claim 1, further comprising repeating the injecting, inspecting, and drying steps if oil is still detected in the void, and repeating the drying step if only moisture is detected in the void.

9. The method of claim 1, wherein the step of inspecting the void for oil is performed using at least one of handheld FTIR spectroscopy, a solvent extraction method, and a visual inspection of a swab that has been rubbed against an inner surface of the void.

10. A method for cleaning shell-spar adhesive voids of a wind turbine blade, comprising:
    detecting a shell-spar adhesive void on the blade using thermography;
    placing the blade on an incline;
    drilling at least one hole into the top end of the void and at least one hole into the bottom end of the void;
    injecting a first cleaning solution into the holes of the void with regular pressure using syringes;
    allowing time for the first cleaning solution to drain from the holes on the bottom of the void; and
    inspecting the void for oil.

11. The method of claim 10, further comprising performing a further cleaning stage if a predetermined amount of oil is detected in the void in the inspecting step, the further cleaning stage comprising the steps of:
    preparing a second cleaning solution for further cleaning of the void;
    injecting the second cleaning solution into at least two holes of the void;
    providing for a rest period to allow the second cleaning solution to clean the void;
    washing the void by using a pressure washer to inject water through each of the holes;
    removing moisture from the void;
    inspecting the void for oil; and repeating the further cleaning stage if oil is still detected in an amount greater than a predetermined acceptable level, and if only water is detected in the void, then only the step of removing moisture from the void is repeated.

12. The method of claim 10, wherein the blade is placed on an incline from the root to the tip so that a top end of the root is raised in the range of 0.5-1.5 meters from the ground.

13. The method of claim 10, wherein the holes are approximately 6 mm in diameter.

14. The method of claim 10, wherein the holes are not greater than 15 cm apart from at least one other hole.

15. The method of claim 10, wherein each hole is not greater than 7 cm from the edge.

16. The method of claim 10, wherein the syringes are 70 ml in volume and have a diameter opening of 5-7 mm.

17. The method of claim 10, further comprising the step of forming at least one hole on the leading edge of the blade if an obstruction is detected after injecting the first cleaning solution, in order to allow the first cleaning solution to be released from the void.

18. The method of claim 10, wherein inspection for oil is performed by use of hand held FTIR spectroscopy.

19. The method of claim 10, wherein moisture is removed from the void by applying compressed air through the void holes by use of an air gun.

20. The method of claim 1, further comprising the step of repairing the void by injecting a fast curing polyurethane adhesive into the holes of the blade no more than 4 hours after the steps of cleaning and drying the void are completed.

\* \* \* \* \*